May 22, 1945.　　　　　E. D. WELLS　　　　　2,376,407
PLUMB BOB REEL
Filed Aug. 27, 1943　　　　2 Sheets-Sheet 1
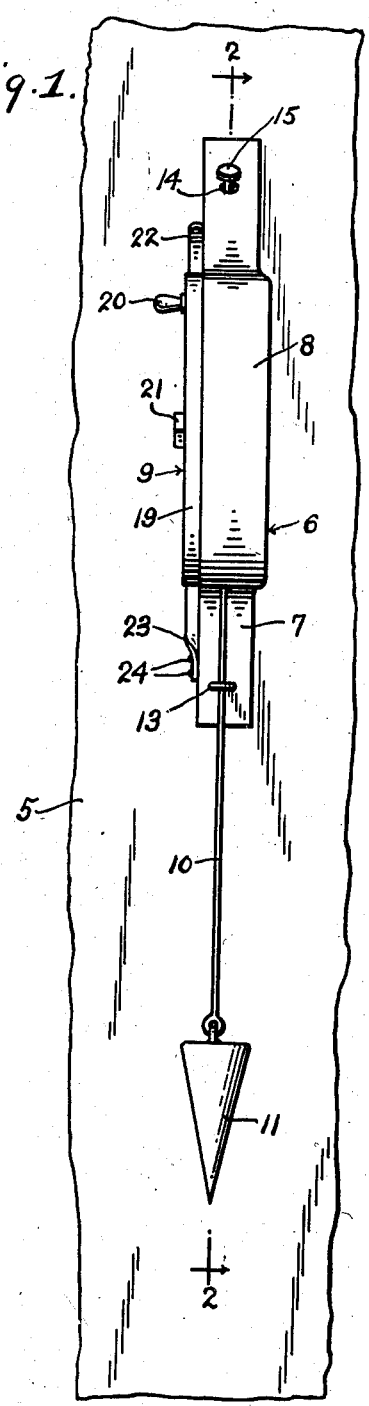
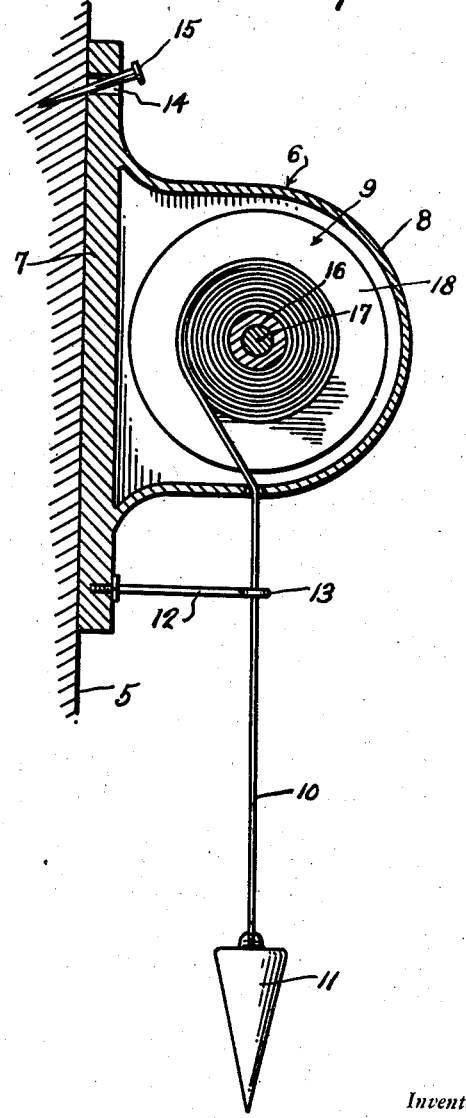
Inventor
Edmund D. Wells May 22, 1945. E. D. WELLS 2,376,407
PLUMB BOB REEL
Filed Aug. 27, 1943 2 Sheets-Sheet 2
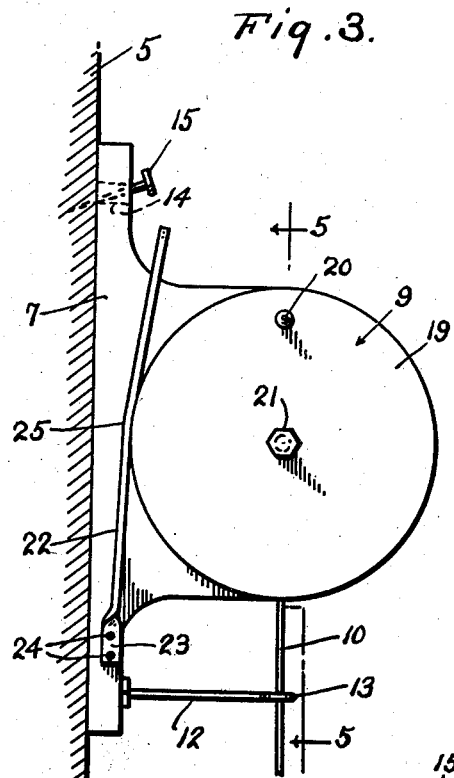
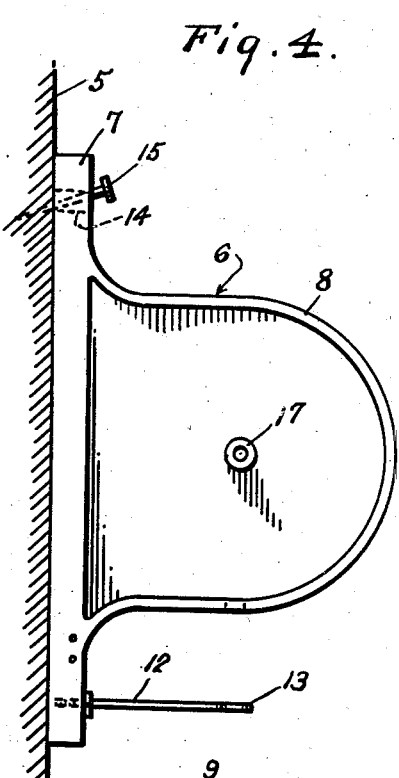
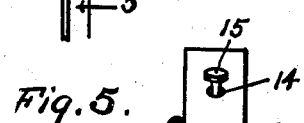
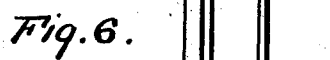
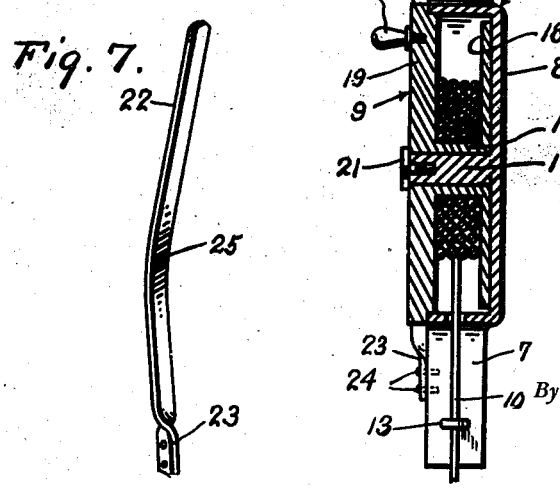
Inventor
Edmund D. Wells
By Clarence A. O'Brien
and Harvey B. Jacobson
Attorneys Patented May 22, 1945

2,376,407

UNITED STATES PATENT OFFICE 2,376,407

PLUMB BOB REEL

Edmund Dougless Wells, Madera, Calif.

Application August 27, 1943, Serial No. 500,296

1 Claim. (Cl. 242—101)

This invention relates to new and useful improvements in plumb bob supporting means and more particularly to a reel and plumb bob which can be attached to a structure to be plumbed in a quick and efficient manner.

Another important object of the invention is to provide a device in the form of a reel, a cable and a plumb bob whereby the cable or line can be wound or unwound in order to position a plumb bob at the desired point.

Other objects and advantages of the invention will become apparent to the reader of the following description.

In the drawings—

Figure 1 represents a fragmentary front elevational view showing the device attached to a wall.

Figure 2 is a vertical section taken on the line 2—2 of Figure 1.

Figure 3 is a fragmentary side elevational view of the attached device.

Figure 4 is a fragmentary side elevational view of the attached device showing the reel removed.

Figure 5 is a section taken on the line 5—5 of Figure 3.

Figure 6 is an elevation of the reel.

Figure 7 is a perspective view of the spring brake.

Referring to the drawings wherein like numerals designate like parts, it can be seen that numeral 5 denotes a wall to which the present device generally referred to by numeral 6 can be attached.

The present invention consists of a wall plate 7 having an open sided housing 8 projecting outwardly therefrom and adapted to contain a reel generally referred to by numeral 9 on which a line 10 is windable, this line having a plumb bob 11 at its outer end.

As can be seen in Figure 2, a pin 12 having a guide eye 13 at its outer end serves to guide the line 10.

The upper end of the wall plate 7 has an opening 14 therein for receiving a nail or the like 15 when attaching the device 6 to a wall to be plumbed.

The reel 9 consists of a hollow core 16 disposed on a pintle 17 projecting from the single side wall of the housing 8. The core 16 has an inner wall 18 and an outer thicker wall 19, the latter being equipped with an eccentrically located handle 20 for rotating the reel. A large headed screw 21 driven into the outer end of the pintle 17 overlaps the wall 19 so as to prevent displacement of the reel.

An elongated spring brake element 22 has its lower end twisted as at 23 and is attached to one edge of the wall plate 7 as at 24. The spring brake element 22 has an offset intermediate portion 25 which engages the periphery of the reel wall 19 to hold the reel against self rotation. This spring brake element 22 should be strong enought to support the plumb bob 11.

Obviously, when the device is attached as in the manner shown in Figure 2 and the spring brake element 22 released from the reel, the weight of the plumb bob will cause rotation of the reel and lengthening of the line 10. When the desired point of descendence of the plumb bob 11 has been obtained, the spring brake element 22 can be released and its engagement with the reel 9 will prevent the plumb bob from descending farther.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

A device of the character described comprising a wall plate having a housing thereon, means for attaching the wall plate to a wall, said housing having an opening in the bottom thereof, a reel mounted in the housing, and adapted for reeling up a line wound on the reel and disposed through the opening, one side of the reel forming one side wall of the housing and provided with a handle thereon whereby the reel may be rotated, said side of the reel extending out of said housing to provide a brake drum, and a leaf spring forming a brake element fixed at one end to said plate and bearing against the periphery of said side of the reel.

EDMUND D. WELLS.